(12) United States Patent
Camier et al.

(10) Patent No.: US 10,793,374 B2
(45) Date of Patent: Oct. 6, 2020

(54) CAPSULE DISPENSING DEVICE

(71) Applicant: NESTEC S.A., Vevey (CH)

(72) Inventors: Nicolas Camier, Brignais (FR); Gilles Gavillet, Ursy (CH); Jean-Claude Gille, Lyons (FR); Isabelle Huynh, Lyons (FR); Christian Jarisch, Lutry (CH); Gautier Montvenoux, Lyons (FR); Lionel Peretti, Bron (FR)

(73) Assignee: Societe des Produits Nestle S.A., Vevey (CH)

( * ) Notice: Subject to any disclaimer, the term of this patent is extended or adjusted under 35 U.S.C. 154(b) by 0 days.

(21) Appl. No.: 15/573,676

(22) PCT Filed: Jun. 17, 2016

(86) PCT No.: PCT/EP2016/063982
§ 371 (c)(1),
(2) Date: Nov. 13, 2017

(87) PCT Pub. No.: WO2016/207069
PCT Pub. Date: Dec. 29, 2016

(65) Prior Publication Data
US 2018/0141761 A1    May 24, 2018

(30) Foreign Application Priority Data
Jun. 23, 2015  (EP) .................... 15173340

(51) Int. Cl.
*B65G 47/256*   (2006.01)
*A47J 31/36*    (2006.01)
*G07F 11/44*    (2006.01)

(52) U.S. Cl.
CPC ........ *B65G 47/256* (2013.01); *A47J 31/3642* (2013.01); *G07F 11/44* (2013.01)

(58) Field of Classification Search
CPC ... G07F 11/44; B65D 85/8046; B65G 47/256; A47J 31/3642
(Continued)

(56) References Cited

U.S. PATENT DOCUMENTS 2,777,561 A * 1/1957 Rose ..................... B65B 35/46
                                                198/393
3,387,695 A * 6/1968 Hendrickson .......... A61J 3/074
                                                198/383
(Continued)

FOREIGN PATENT DOCUMENTS

EP    1797800    6/2007
EP    2106727    10/2009
(Continued)

*Primary Examiner* — Rakesh Kumar
(74) *Attorney, Agent, or Firm* — K&L Gates LLP (57) ABSTRACT

A cartridge dispenser (1) has: a receptacle (10) delimiting a cavity (10') for storing cartridges (2); a cartridge outlet (11) for dispensing a single cartridge at a time from said cartridges (2), the single cartridge being dispensed in a predetermined cartridge dispensing orientation; and a cartridge transfer device (12,13,14) for transferring cartridges (2) from the cavity (10') to the cartridge outlet (11). The cavity (10') is so dimensioned that cartridges (2) can be stored in bulk therein at random capsule orientations. The transfer device comprises a delivery conveyor that is configured to displace cartridges from the bulk of cartridges towards the outlet and to deliver the cartridges (2) to the outlet (11) via an orientation-discrimination passage (15) which ensures that the cartridges (2) are delivered one at the time to the outlet (11) and that each cartridge (2,2a) that is delivered to the outlet (11) is in the predetermined orientation at the outlet (11).

11 Claims, 3 Drawing Sheets

(58) Field of Classification Search
USPC .......................................................... 221/171
See application file for complete search history.

(56) References Cited

U.S. PATENT DOCUMENTS

| | | | | |
|---|---|---|---|---|
| 3,747,738 | A * | 7/1973 | Greck .................... | B65G 51/02 |
| | | | | 406/31 |
| 3,777,769 | A * | 12/1973 | Ueno ...................... | G06M 1/10 |
| | | | | 453/32 |
| 4,205,743 | A * | 6/1980 | Whitmore .......... | B65G 47/1457 |
| | | | | 198/393 |
| 4,677,283 | A * | 6/1987 | Lewis .................... | G06M 7/00 |
| | | | | 198/383 |
| 6,401,429 | B2 * | 6/2002 | Aylward ................. | B65B 5/103 |
| | | | | 53/244 |
| 6,505,460 | B2 * | 1/2003 | Aylward ................. | B65B 5/103 |
| | | | | 53/473 |
| 8,986,084 | B2 * | 3/2015 | Starke .................... | G07D 9/008 |
| | | | | 453/55 |
| 9,409,723 | B2 * | 8/2016 | Seidl ..................... | B65G 37/00 |
| 10,150,624 | B2 * | 12/2018 | Doudement ....... | B65G 47/1464 |
| 2015/0040769 | A1 * | 2/2015 | Righetti ............... | A47J 31/407 |
| | | | | 99/290 |
| 2018/0141761 | A1 * | 5/2018 | Camier ................... | G07F 11/44 |
| 2018/0253927 | A1 * | 9/2018 | Houtsaeger ........ | B65D 85/8046 |

FOREIGN PATENT DOCUMENTS

| | | | | |
|---|---|---|---|---|
| EP | 2860711 A1 * | 4/2015 | ............. | G07F 11/58 |
| WO | WO-2015021533 A1 * | 2/2015 | ............. | B65G 47/31 |
| WO | WO-2017037675 A1 * | 3/2017 | ......... | B65D 85/8046 |

* cited by examiner

Fig. 5

CAPSULE DISPENSING DEVICE

CROSS REFERENCE TO RELATED APPLICATIONS

The present application is a National Stage of International Application No. PCT/EP2016/063982, filed on Jun. 17, 2016, which claims priority to European Patent Application No. 15173340.9, filed on Jun. 23, 2015, the entire contents of which are being incorporated herein by reference.

FIELD OF THE INVENTION

The present invention relates to a cartridge-dispensing device, the cartridge containing at least one beverage ingredient to be supplied to beverage preparation machines for preparing a beverage.

For the purpose of the present description, a "beverage" is meant to include any liquid food, such as tea, coffee, hot or cold chocolate, milk, soup, baby food, etc. . . . A "cartridge" is meant to include any pre-portioned beverage ingredient, such as a flavoring ingredient, within an enclosing packaging of any material, in particular an airtight packaging, e.g. plastic, aluminium, recyclable and/or biodegradable packagings, and of any shape and structure, including soft pods or rigid capsules containing the ingredient. The cartridge may contain an amount of ingredient for preparing a single beverage serving or a plurality of beverage servings.

BACKGROUND ART

Beverage preparation machines have been known for a number of years. For example, U.S. Pat. No. 5,943,472 discloses a water circulation system between a water reservoir and a hot water or vapour distribution chamber of an espresso machine. The circulation system includes a valve, metallic heating tube and pump that are connected together and to the reservoir.

A beverage preparation machine typically includes a housing containing a beverage processing module and a water supply, e.g. a water tank, in fluid communication with the beverage processing module. Examples of such beverage preparation machines are disclosed in EP 1 208 782, EP 1 267 687, EP 1 686 879, EP 1 731 065, EP 1 829 469, EP 1 864 598, EP 1 865 815, EP 1 867 260, EP 1 878 368, EP 2 222 210, EP 2 222 211, EP 2 222 212, EP 2 227 121, EP 2 227 122, US 2008/0006159, U.S. Pat. No. 7,165,488, WO 2007/111884, WO 2009/074553, WO 2010/015427 and WO 2012/055767.

The use of systems for preparing beverages from cartridges is undergoing widespread expansion owing to the numerous advantages generally provided by these systems. These systems may be drink-dispensing machines, for example, which operate using cartridges containing a drink base. Using these cartridges, the consumer may prepare a drink simply, rapidly and mostly with minimum intervention in terms of preparation and/or cleaning.

Cartridges may be, for example, portion packs whose configuration, size and/or nature vary considerably. These cartridges may be made of plastic film, filter paper, aluminium or composite laminates and may be in the form of tablets, e.g. lenses, or take other forms.

When these machines are used intensively, there is a need to have sufficient cartridge stock available to prevent the stock from running out early. To this end, a stock of cartridges may be handled by a cartridge dispenser.

For instance, cartridge dispensers may be appropriate in larger offices and other places with a similar cartridge turn-over.

Typically, there is a need to dispense such cartridges at workplaces where demand is generally high during a short period of the day, for example during the coffee break. There is therefore a need to dispense cartridges in a practical manner, rapidly and, if appropriate, using a suitable method of payment.

For example, U.S. Pat. No. 6,595,106 relates to a magazine for cartridges making it possible to store a plurality of cartridges stacked one above the other. The cartridges may thus be removed from the magazine on demand via an opening made at the base of the magazine. One disadvantage arises from the fact that the cartridges have to be removed manually. Another disadvantage lies in the fact that this system cannot be associated with a payment system. These and other issues have been addressed in EP 1 744 650.

EP 1 247 481 A1 illustrates a drink-extraction device comprising an integrated cartridge-loading system. Such a system is practical since it enables a cartridge-extraction system to be supplied automatically by means of a carousel positioned in direct relation to the extraction system. Such a device comprises packs in the form of removable tubes for storing cartridges, these packs being adapted in relation to tubular supports mounted on a rotating base. Such a system is practical although its capacity to prepare drinks is not at the level of its storage capacity. Thus, it is necessary to await the complete end of the extraction and removal of the spent cartridge in order to be able to select and extract a new cartridge. Neither does such a device make it possible to retain the cartridge for a subsequent extraction of the cartridge in the preparation machine if the user wishes to do so. Moreover, the extraction system can only be used with cartridges contained in the dispenser, which may cause problems particularly if it is short of cartridges of a desired type, or else if the dispenser breaks down.

U.S. Pat. No. 2,141,684 concerns the dispensing of elongate elements such as kitchen utensils. Supply takes place manually in a series of loaders forming part of the device and release takes place using independent push-button mechanisms. U.S. Pat. No. 2,268,688 is a rotating sugar cube dispenser in which the cubes are dispensed from stacks held in a series of housings distributed over the circular periphery of the dispenser. The dispenser is supplied manually. Push-type mechanisms are provided to allow the sugar cube to drop into a central passage. U.S. Pat. No. 2,206,838 is a dispenser of a stack of paper cups. Patent GB 844,600 is a tetrahedral-pack dispenser, dispensing them from a single column using a tilting mechanism, permitting optimum stowing of the packs.

SUMMARY OF THE INVENTION

A preferred object of the invention is to provide a system for storing cartridges in bulk and at random capsule orientations and dispensing the cartridges one by one in a predetermined capsule orientation.

Another object of the invention is to provide a system for storing cartridges and automatically dispensing them in a quick and efficient manner.

The invention thus relates to a cartridge dispenser having:
a receptacle delimiting a cavity for storing cartridges, optionally the receptacle comprising a lid and/or at least one transparent or translucent wall for visual inspection of the cavity from outside such dispenser, e.g. to check the level of cartridges in the cavity;

a cartridge outlet for dispensing a single cartridge at a time from the cartridges in a predetermined cartridge dispensing orientation; and a cartridge transfer device for transferring cartridges from the cavity to the cartridge outlet.

The cavity is so dimensioned that cartridges can be stored in bulk therein at random capsule orientations.

The transfer device comprises a delivery conveyor that is configured to displace cartridges from the bulk of cartridges towards the outlet and to deliver the cartridges to the outlet via an orientation-discrimination passage which ensures that the cartridges are delivered one at the time to the outlet and that each cartridge that is delivered to the outlet is in the predetermined cartridge orientation at the outlet.

Hence, cartridges may be supplied in bulk into the cavity of the receptacle while being dispensed in a predetermined cartridge dispensing orientation. The cartridge transfer device with the orientation-discrimination passage can thus handle twisted, tilted cartridges or improperly positioned cartridges (e.g. (partly and randomly) overlapping another cartridge) that are driven by the delivery conveyor towards the outlet so that only properly oriented cartridges are dispensed by the dispenser.

This orientation-discrimination passage can be a passage which for each cartridge to be delivered:

maintains the cartridge orientation of the cartridge to be delivered to the outlet, when the cartridge when close to or reaching the passage is in itself in a proper position and orientation for being delivered to the outlet in the predetermined cartridge orientation; or adjusts the cartridge orientation and/or position of the cartridge or rejects the cartridge to the bulk of cartridges in the cavity, when the cartridge (when close to or reaching the passage) is not in itself in a proper position or orientation for being delivered to the outlet in the predetermined cartridge orientation.

A cartridge may be rejected due to a geometric discrimination by the passage. For instance, the cartridge has an off-set position and/or tilted orientation (such as an improper cartridge position and/or orientation resulting from the cartridge overlapping another cartridge) when reaching the passage that do(es) not fit the geometric boundaries of the orientation-discrimination passage and is thus prevented from entering the passage and kept outside the passage.

A cartridge may be rejected by an active ejector at the passage, e.g. a mobile ejector. For instance, the cartridge has an off-set position and/or tilted orientation (such as an improper cartridge position and/or orientation resulting from the cartridge overlapping another cartridge) when reaching the passage that interfere(s) with the action (e.g. movement) of such an ejector, the ejector being for instance a pusher member, e.g. a reciprocating rod, or a conveyor.

The transfer device may include at least one electric motor for driving the delivery conveyor, such as a motor connected to a control unit and a user-interface.

The dispenser can include one or more cartridge sensors, such as at least one of and outlet sensor and a cartridge availability sensor.

The outlet sensor, e.g. an optical sensor such as IR sensor, can be configured for sensing at least one of a presence, an absence or a removal of a cartridge from the outlet, e.g. an outlet sensor located at the outlet. Hence, the dispenser may be configured to supply a cartridge to the outlet only in the absence of a cartridge at the outlet.

The cartridge availability sensor can be configured for sensing the presence of a cartridge that can be driven to the outlet, e.g. an availability sensor located at the cavity, the transfer device or the outlet. Hence, the dispenser may be configured to supply a cartridge to the outlet only in the presence of available cartridges. When no cartridge is available or when a low quantity of cartridges has been sensed, the dispenser may be configured to indicate on a user-interface of the dispenser (on-site) or at a distant location (e.g. via a transmission system, such as wired or wireless), the need to refill the cavity of the receptacle with new cartridges.

The delivery conveyor may be associated with a least one delivery guide for guiding cartridges inside the cavity to the conveyor. The delivery guide may take the form of one or more ramps that are at least one of straight, cylindrical and helicoidal. The delivery guide may be formed by an inner sidewall of the receptacle or by an element in or extending into the receptacle.

The orientation-discrimination passage can be delimited by a window that is so dimensioned as to allow only one cartridge to pass therethrough at a time. For instance, the window has a height that is equal or slightly greater than an overall thickness of a cartridge and/or a width that is slightly wider than a width of the cartridge. By providing such a window, the dimensions of which are (slightly) greater than the cartridge to be dispensed, the window will not interfere with the passage through the window of the cartridge when properly positioned and oriented.

The window may have at least one side, e.g. a bottom side, delimited by the delivery conveyor.

The orientation-discrimination passage can be associated with or can comprise or can be delimited by a return conveyor that is configured to move within the cavity away from the passage cartridges that are close to or reaching the passage and that are improperly oriented or positioned to pass through the passage.

Hence, the delivery conveyor is configured to drive each cartridge to be dispensed towards or to the outlet or bring it into position at the outlet whereas, when present, the return conveyor ensures that the cartridges are delivered one at the time to the outlet and reduces the risk of cartridge jamming.

The return conveyor can be configured to move the improperly oriented or positioned cartridges above the passage.

The return conveyor may be associated with an inversion area for cartridges downstream the return conveyor in the cavity. For instance, such as an inversion area has a volume for accommodating a plurality of returned cartridges and/or is located upstream the orientation-discrimination passage along a direction extending from a passage direction at an entry of the passage.

The return conveyor can be positioned to delimit a side, such as a top side, of the orientation-discrimination passage or of the abovementioned window.

The return conveyor may be driven by an electric motor such as a motor driving also the delivery conveyor.

The return conveyor may have a part facing a part of the delivery conveyor and moving in opposition thereto. These facing parts may optionally delimit the abovementioned window. The part of the return conveyor can be configured to move faster than the part of the delivery conveyor such that the cartridge return movement prevails over the cartridge delivery movement when an improperly oriented or positioned cartridge is exposed to both conveyors.

The return conveyor can be associated with a return guide, such as a ramp e.g. a straight or helicoidal ramp, configured to guide cartridges moved away from the orientation-discrimination passage by the return conveyor back towards the delivery conveyor. For instance, the return guide:

separates the cartridge outlet from the cavity, the cavity extending optionally above the outlet; and/or provides a cartridge buffer and evacuation zone between the return conveyor and the bulk of cartridges in the cavity to prevent clogging of the return conveyor and/or of the orientation-discrimination passage by cartridges.

The return conveyor may include at least one of a belt conveyor, plate conveyor e.g. a disc conveyor, a roll conveyor, a chain conveyor, a screw conveyor and a cylinder conveyor.

The return conveyor can include a transport friction surface or friction vibrating surface for driving cartridges by friction and/or or transport buckets for driving cartridges in corresponding conveyor seats.

The outlet can have a dispensing opening through which cartridges are driven or made available to outside the dispenser in the dispensing orientation.

The outlet can have a guide arrangement, such as member of the outlet and/or an inner surface of the receptacle, along which cartridges are guided to outside the dispenser in the dispensing orientation.

The delivery conveyor can be configured to drive each cartridge along the orientation-discrimination passage and the outlet, optionally the conveyor further driving the cartridge to outside the dispenser device.

The delivery conveyor can include at least one of a belt conveyor, plate conveyor e.g. a disc conveyor, a roll conveyor, a chain conveyor, a screw conveyor and a cylinder conveyor.

The delivery conveyor may include a transport friction surface or friction vibrating surface for driving cartridges by friction and/or or transport buckets for driving cartridges in corresponding conveyor seats.

In a particular embodiment, the dispenser has a rotating plate, e.g. a disc, as a distribution conveyor and a rotating roll, as a return conveyor. The axis of rotation of the rotating roll can be parallel or preferably perpendicular to the axis of rotation of the rotating plate.

The invention also relates to a combination of a dispenser described above and a plurality of cartridges in the cavity of the receptacle.

Another aspect of the invention relates to a method of operating a dispenser as described above to dispense cartridges.

A further aspect of the invention relates to a use of a plurality of cartridges as the cartridges for:
 a dispenser as described above;
 implementing a combination as described above; or
 carrying out a method as described above.

Each cartridge can include a generally tablet-shaped body, e.g. a generally circular body such as a generally lense-shaped body, and optionally a circular peripheral annulus flange, e.g. a flexible flange. The flange (when present) may extend from a peripheral part, e.g. an edge or lateral face, of the body. At least one of the cartridges can contain a flavoring ingredient for preparing tea, coffee, hot chocolate, cold chocolate, milk, soup or baby food.

The dispenser can be incorporated into a beverage preparation machine, e.g. a coffee machine, or can be a standalone dispenser separate to a beverage preparation machine, e.g. a coffee machine. When the dispenser is incorporated into a beverage preparation machine, the dispenser's outlet can be connected to the cartridge inlet of the machine's beverage processing module.

The beverage preparation machine can be an in-home or more commonly an out of home machine. The machine may be for the preparation of coffee, tea, chocolate, cacao, milk, soup, baby food, etc. . . . The machine may be arranged for preparing within the beverage processing module a beverage by passing hot or cold water or another liquid through the cartridge dispensed by the dispenser and containing an ingredient, such as a flavouring ingredient, of the beverage to be prepared, such as ground coffee or tea or chocolate or cacao or milk powder.

The beverage preparation typically includes the mixing of a plurality of beverage ingredients, e.g. water and milk powder, and/or the infusion of a beverage ingredient, such as an infusion of ground coffee or tea with water. One or more of such ingredients may be supplied in loose and/or agglomerate powder form and/or in liquid form, in particular in a concentrate form. A carrier or diluents liquid, e.g. water, may be mixed with such ingredient to form the beverage. The liquid may be supplied manually and/or via an external delivery system.

For instance, a predetermined amount of beverage is formed and dispensed on user-request, which corresponds to a serving. The volume of such a serving may be in the range of 25 to 200 ml and even up to 300 or 400 ml, e.g. the volume for filling a cup, depending on the type of beverage. Formed and dispensed beverages may be selected from ristrettos, espressos, lungos, cappuccinos, latte macchiato, café latte, americano coffees, teas, etc. . . . For example, a coffee machine may be configured for dispensing espressos, e.g. an adjustable volume of 20 to 60 ml per serving, and/or for dispensing lungos, e.g. a volume in the range of 70 to 150 ml per serving.

BRIEF DESCRIPTION OF THE DRAWINGS

The invention will now be described with reference to the schematic drawings, wherein.

DETAILED DESCRIPTION

FIGS. 1 to 5 illustrates a particular embodiment of a dispenser in accordance with the invention.

Cartridge dispenser 1 has a receptacle 10 delimiting a cavity 10' for storing cartridges 2. For instance, receptacle 10 has a lid and/or at least one transparent or translucent wall 10" for visual inspection of cavity 10' from outside such dispenser 1, e.g. to check the level of cartridges in cavity 10'.

Dispenser 1 has a cartridge outlet 11 for dispensing a single cartridge at a time from cartridges 2, the single cartridge being dispensed in a predetermined cartridge dispensing orientation.

Dispenser 1 includes a cartridge transfer device 12,13,14 for transferring cartridges 2 from cavity 10' to cartridge outlet 11.

Cavity 10' is so dimensioned that cartridges 2 can be stored in bulk therein at random capsule orientations.

Transfer device 12,13,14 includes a delivery conveyor 12 that is configured to displace cartridges from the bulk of cartridges 2 towards outlet 11 and to deliver cartridges 2 to outlet 11 via an orientation-discrimination passage 15 which ensures that cartridges 2 are delivered one at the time to outlet 11 and that each cartridge 2,2a that is delivered to outlet 11 is in the predetermined cartridge orientation at outlet 11.

The passage may be a passage 15 which for each cartridge to be delivered:
  maintains the cartridge orientation of the cartridge to be delivered to the outlet 11, when cartridge 2 (when close to or reaching passage 15) is in itself in a proper position and orientation for being delivered to outlet 11 in the predetermined cartridge orientation; or
  adjusts the cartridge orientation and/or position of the cartridge or rejects cartridge 2a to the bulk of cartridges 2,2a in cavity 10', when cartridge 2a (when close to or reaching said passage 15) is not in itself in a proper position or orientation for being delivered to outlet 11 in the predetermined cartridge orientation.

A cartridge 2a may be rejected due to a geometric discrimination by passage 15. For instance, cartridge 2a has an off-set position and/or tilt orientation when reaching passage 15 (such a position and orientation resulting from partial or complete overlap or another cartridge 2) that does not fit the geometric boundaries of the orientation-discrimination passage and is thus prevented from entering the passage and kept outside the passage.

A cartridge 2a may be rejected by an active ejector associated with or comprised by or delimiting passage 15, e.g. a mobile ejector, of passage 15. For instance, cartridge 2a has an off-set position and/or tilt orientation when reaching passage 15 (such a position and orientation resulting from partial or complete overlap or another cartridge 2) that interferes with the action (e.g. movement) of such an ejector, the ejector being for instance a pusher member, e.g. a reciprocating rod, or conveyor.

Transfer device 12,13,14 may include at least one electric motor 14 for driving delivery conveyor 12, such as a motor connected to a control unit and a user-interface.

Dispenser 1 can have one or more cartridge sensors 110,111 such as at least one of outlet sensor 110 and a cartridge availability sensor 111.

Outlet sensor 110, e.g. an optical sensor such as IR sensor, can be configured for sensing at least one of a presence, an absence or a removal of a cartridge 2 from outlet 11, e.g. an outlet sensor 110 located at outlet 11.

Cartridge availability sensor 111 can be configured for sensing the presence of a cartridge 2 that can be driven to outlet 11, e.g. an availability sensor 111 located at cavity 10', at transfer device 12,13,14 or at outlet 11.

Delivery conveyor 12 can be associated with a least one delivery guide 12',13', such as one or more ramps 12',13', for guiding cartridges 2,2a inside cavity 10' to delivery conveyor 12. Such ramps 12',13 can be straight, cylindrical or helicoidal or be made of different sections that are each straight, cylindrical and/or helicoidal. Delivery guide 12',13' can be formed by an inner sidewall 12' of receptacle 10 or by an element 13' in or extending into receptacle 10.

Orientation-discrimination passage 15 can be delimited by a window that is so dimensioned as to allow only one cartridge 2 to pass therethrough at a time. For instance, the window has a height that is equal or slightly greater than an overall thickness of a cartridge 2,2a and/or a width slightly wider than a width of the cartridge 2,2a. The window may have at least one side, e.g. a bottom side, delimited by delivery conveyor 12.

Orientation-discrimination passage 15 can be is associated with or can comprise or can be delimited by a return conveyor 13 that is configured to move, within cavity 10' away from passage 15, cartridges 2a that are close to or reaching the passage 15 and that are improperly oriented or positioned to pass through passage 15.

Return conveyor 13 can be configured to move the improperly oriented or positioned cartridges 2a above the passage 15.

Return conveyor 13 may be associated with an inversion area 16 for cartridges 2a downstream return conveyor 13 in cavity 10'. Inversion area 16 may have a volume for accommodating a plurality of returned cartridges 2a and/or may extend upstream orientation-discrimination passage 15 along a direction 16' extending from a passage direction 15' at an entry of passage 15.

Return conveyor 13 can be positioned to delimit a side, such as a top side, of orientation-discrimination passage 15.

Return conveyor 13 may be driven by an electric motor 14. Delivery conveyor 12 may be driven by the same motor 14.

Return conveyor 13 can have a part 13" facing a part 12" of delivery conveyor 12 and moving in opposition thereto. Facing parts 12",13" may optionally delimit the abovementioned window. Part 13" of return conveyor 13 may be configured to move faster than part 12" of delivery conveyor 12 such that the cartridge return movement prevails over the cartridge delivery movement when an improperly oriented or positioned cartridge 2a is exposed to both conveyors 12,13.

Return conveyor 13 can be associated with a return guide 13', such as a ramp e.g. a straight or helicoidal ramp, configured to guide cartridges 2a moved away from orientation-discrimination passage 15 by return conveyor 13 back towards delivery conveyor 12.

Return guide 13 can separate cartridge outlet 11 from cavity 10'. For instance, cavity 10' extends above outlet 11.

Return guide 13 may provide a cartridge buffer and evacuation zone between return conveyor 13 and the bulk of cartridges 2,2a in cavity 10' to prevent clogging of return conveyor 12 and/or of orientation-discrimination passage 15 by cartridges 2a.

Return conveyor 13 may have at least one of a belt conveyor, plate conveyor e.g. a disc conveyor, a roll conveyor, a chain conveyor, a screw conveyor and a cylinder conveyor.

Return conveyor 13 can include a transport friction surface 13 or friction vibrating surface for driving cartridges 2a by friction and/or or transport buckets for driving cartridges in corresponding conveyor seats.

Outlet 11 can have a dispensing opening 11' through which cartridges 2 are driven or made available to outside dispenser 1, cartridges 2 being in the dispensing orientation when driven or made available to outside dispenser 1.

Outlet 11 may have a guide arrangement 11",11'", such as member 11" of outlet 11 and/or an inner surface 11'" of receptacle 10, along which cartridges 2 are guided to outside dispenser 1, the cartridges being in the dispensing orientation upon guiding to outside dispenser 1.

Delivery conveyor 12 can be configured to drive each cartridge 2 along orientation-discrimination passage 15 and outlet 11. Optionally, delivery conveyor 12 guides each cartridge 2 to outside dispenser device 1.

Delivery conveyor 12 may have at least one of a belt conveyor, plate conveyor e.g. a disc conveyor, a roll conveyor, a chain conveyor, a screw conveyor and a cylinder conveyor.

Delivery conveyor 12 can include a transport friction surface 12 or friction vibrating surface for driving cartridges 2 by friction and/or or transport buckets for driving cartridges in corresponding conveyor seats.

Dispenser 1 is operated by:
  storing cartridges 2,2a in bulk at random capsule orientations in the cavity 10' of receptacle 10, e.g. loose cartridges 2,2a being introduced into the cavity 10' without ensuring any particular cartridge order or orientation;
  transferring to cartridge outlet 11 cartridges 2, one at the time, by cartridge transfer device 12,13,14 that displaces each cartridge 2 by delivery conveyor 12 to outlet 11 via an orientation-discrimination passage 15 which ensures that each cartridge 2,2a that is delivered to outlet 11 is in the predetermined cartridge orientation at outlet 11; and
  dispensing by cartridge outlet 11 each cartridge 2 in the predetermined cartridge dispensing orientation.

Figure 1:
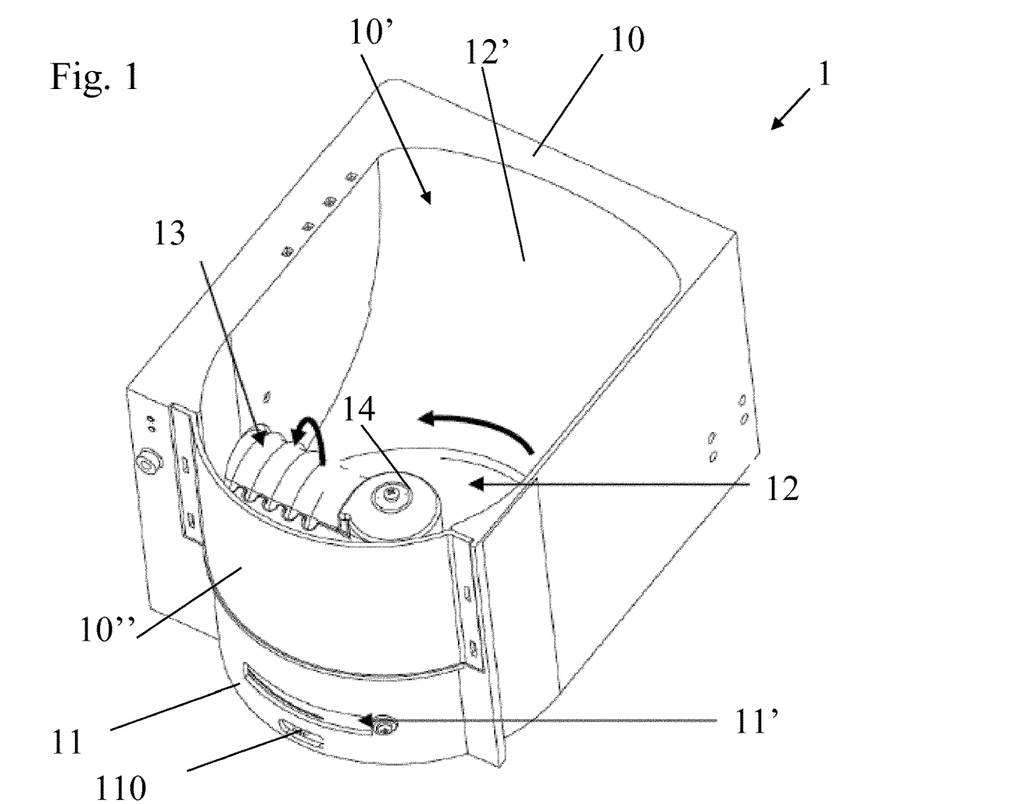
FIG. 1 is a perspective view from above of a dispenser in accordance with the invention.
Figure 2:
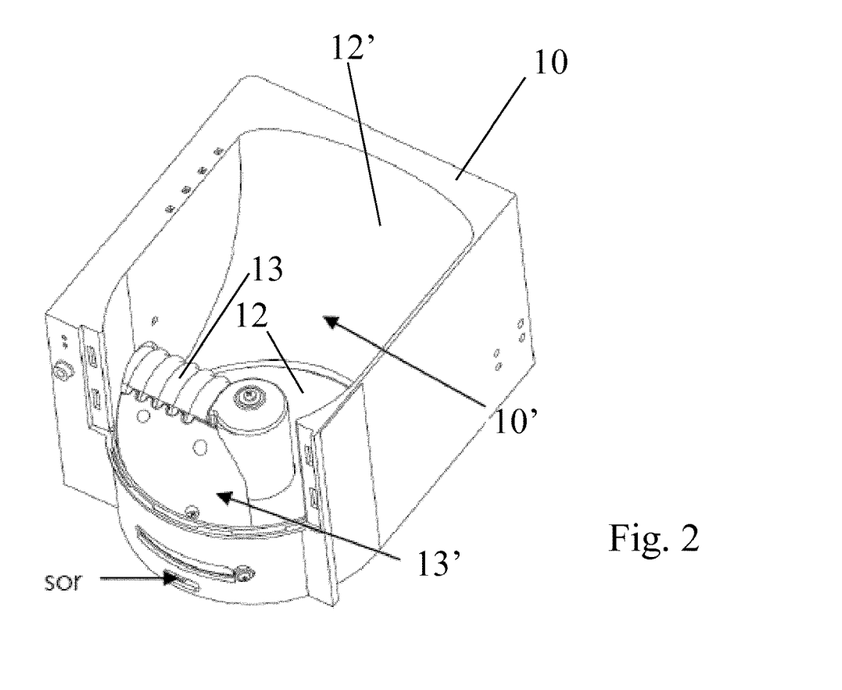
FIG. 2 shows the dispenser of FIG. 1 upon removal or a front wall thereof.
Figure 3:
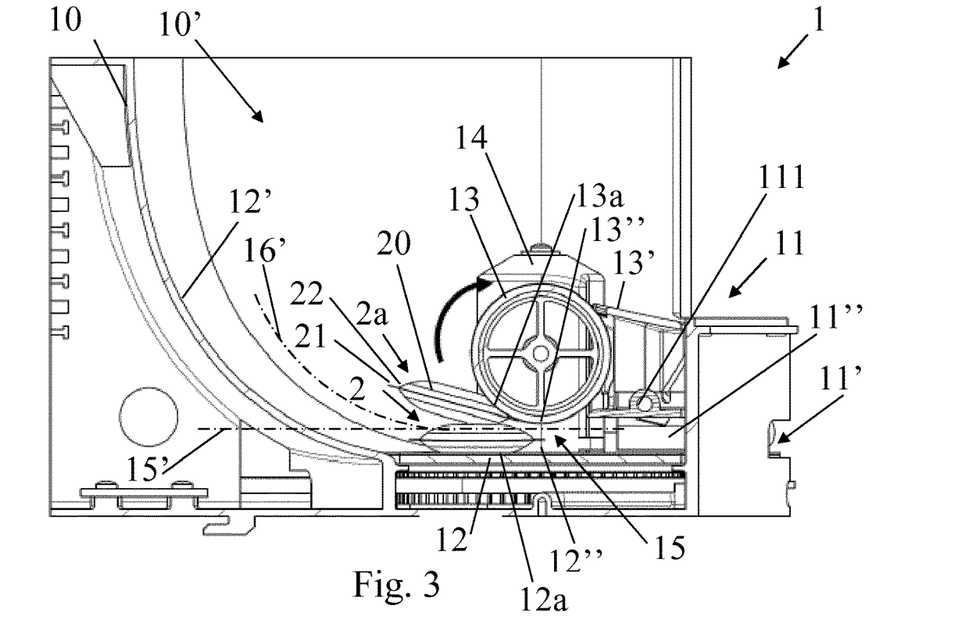
FIG. 3 shows the dispenser of FIG. 1 in cross-section.
Figure 4:
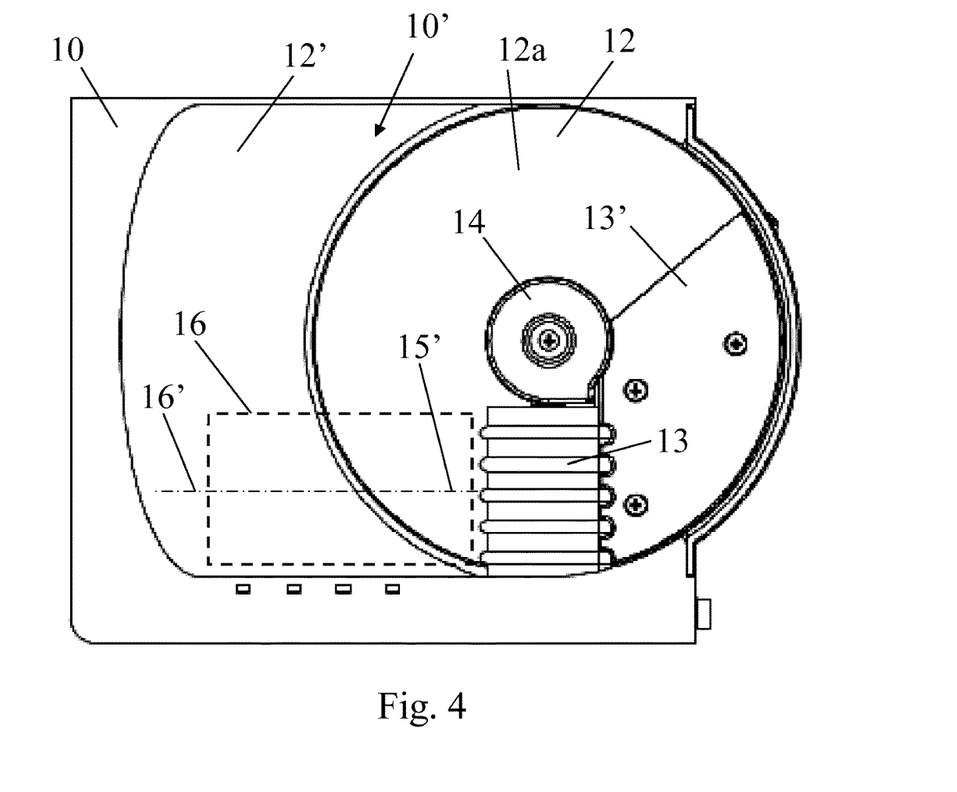
FIG. 4 shows the dispenser of FIG. 1 from above.
Figure 5:
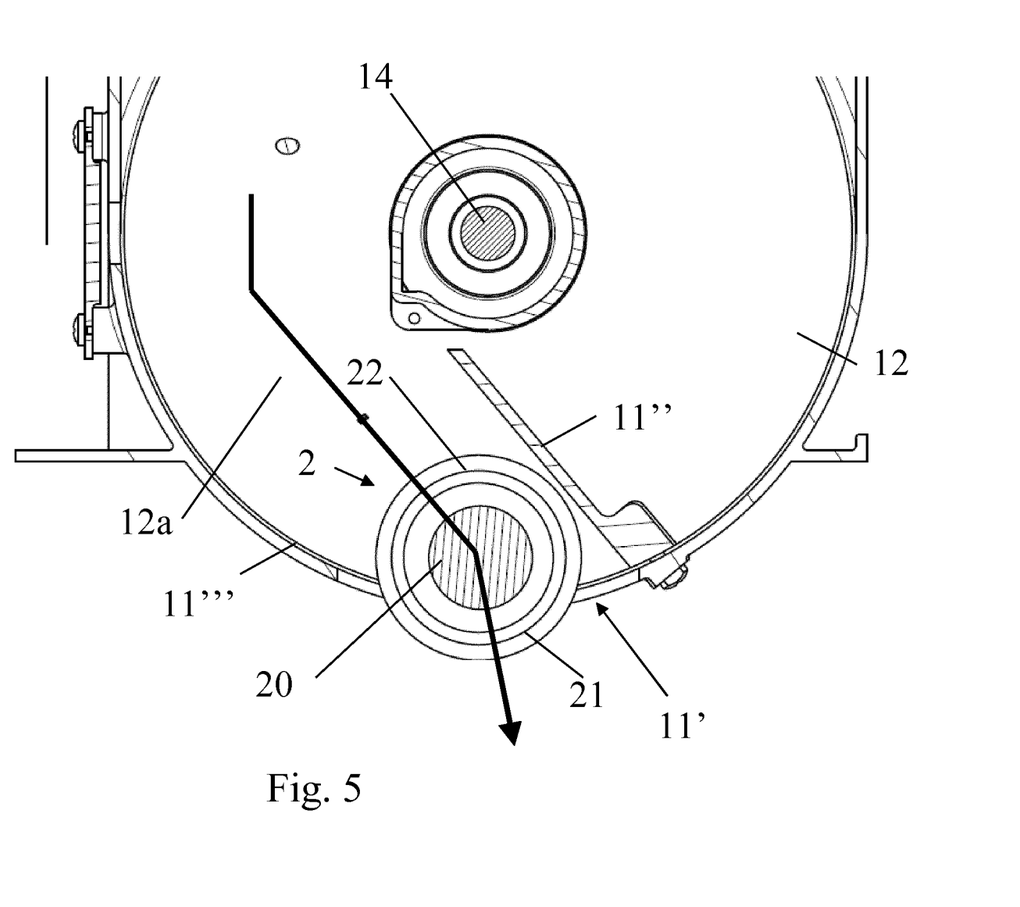
FIG. 5 illustrates a cartridge at the outlet of the dispenser of FIG. 1.

Each cartridge 2,2a can comprise a generally tablet shaped body 20, e.g. a generally circular body such as a generally lense-shaped body 20, and optionally a circular peripheral annulus flange 21, e.g. a flexible flange, extending from a peripheral part 22, e.g. an edge or lateral face, of body 20.

At least one of cartridges 2,2a can contain a flavoring ingredient for preparing tea, coffee, hot chocolate, cold chocolate, milk, soup or baby food.

The invention claimed is:

1. A cartridge dispenser comprising:
  a receptacle defining a cavity for storing cartridges;
  a cartridge outlet for dispensing a single cartridge at a time from cartridges in the cavity, the single cartridge being dispensed in a predetermined cartridge dispensing orientation;
  a cartridge transfer device for transferring the cartridges from the cavity to the cartridge outlet;
  the cavity is so dimensioned that the cartridges can be stored in bulk therein at random cartridge orientations; and
  the cartridge transfer device comprises a delivery conveyor that is configured to drive each of the cartridges from the bulk of the cartridges towards the cartridge outlet and to drive each of the cartridges to the cartridge outlet along an orientation-discrimination passage comprising a return conveyor, the orientation-discrimination passage ensures that each of the cartridges are driven one at a time to the cartridge outlet and that each of the cartridges that is driven to the cartridge outlet is in the predetermined cartridge orientation at the cartridge outlet,
  wherein the orientation-discrimination passage is configured to:
  maintain the random cartridge orientation of the cartridge to be driven to the cartridge outlet when the cartridge to be driven is close to or reaching the orientation-discrimination passage and is in a first position and orientation for being driven to the cartridge outlet in the predetermined cartridge dispensing orientation;
  adjust the random cartridge orientation and/or a position of the cartridge to be driven when the cartridge to be driven is close to or reaching the orientation-discrimination passage and is in one or more second position, each offset or tilted relative to the first position; and
  reject the cartridge to be driven to the bulk of stored cartridges in the cavity using the return conveyor, the return conveyor configured to move one or more cartridges within the cavity and away from the orientation-discrimination passage when the one or more cartridges are in the one or more second position and when the cartridge to be driven is close to or reaching the orientation-discrimination passage.

2. The cartridge dispenser of claim 1, wherein the delivery conveyor is associated with a least one delivery guide for guiding the cartridges inside the cavity to the delivery conveyor.

3. The cartridge dispenser of claim 1, wherein the orientation-discrimination passage is defined by a window that is dimensioned to allow only one cartridge to pass there through at a time.

4. The cartridge dispenser of claim 1, wherein the delivery conveyor comprises a roll conveyor.

5. The cartridge dispenser of claim 1, wherein the return conveyor has a part facing a part of the delivery conveyor and configured for moving in opposition thereto.

6. The cartridge dispenser of claim 1, wherein the return conveyor is associated with a return guide configured to guide one or more cartridges, that have been moved away from the orientation-discrimination passage by the return conveyor, back towards the delivery conveyor.

7. The cartridge dispenser of claim 1, wherein the return conveyor comprises roll conveyor.

8. The cartridge dispenser of claim 1, wherein the cartridge outlet has a dispensing opening through which the cartridges are driven or made available to outside the cartridge dispenser in the predetermined cartridge dispensing orientation.

9. The cartridge dispenser of claim 1, wherein the cartridge outlet has a guide arrangement, along which the cartridges are guided to outside the cartridge dispenser in the predetermined cartridge dispensing orientation.

10. A cartridge dispenser comprising:
  a receptacle defining a cavity for storing cartridges, each cartridge comprises a body and a circular annulus flange extending from a peripheral part of the body;
  a cartridge outlet for dispensing a single cartridge at a time from cartridges in the cavity, the single cartridge being dispensed in a predetermined cartridge dispensing orientation;
  a cartridge transfer device for transferring the cartridges from the cavity to the cartridge outlet;
  the cavity is so dimensioned that the cartridges can be stored in bulk therein at random cartridge orientations; and
  the cartridge transfer device comprises a delivery conveyor that is configured to drive each of the cartridges from the bulk of the cartridges towards the cartridge outlet and to drive each of the cartridges to the cartridge outlet along an orientation-discrimination passage comprising a return conveyor, the orientation-discrimination passage ensures that each of the cartridges are driven one at a time to the cartridge outlet and that each of the cartridges that is driven to the cartridge outlet is in the predetermined cartridge orientation at the cartridge outlet,
  wherein the orientation-discrimination passage is configured to:
  maintain the random cartridge orientation of the cartridge to be driven to the cartridge outlet when the cartridge to be driven is close to or reaching the orientation-discrimination passage and is in a first position and orientation for being driven to the cartridge outlet in the predetermined cartridge dispensing orientation;
  adjust the random cartridge orientation and/or position of the cartridge to be driven when the cartridge to be driven is close to or reaching the orientation-discrimination passage and is in one or more second position, each offset or tilted relative to the first position; and reject the cartridge to be driven to the bulk of stored cartridges in the cavity using the return conveyor, the return conveyor configured to move one or more cartridges that are in the one or more second position within the cavity and away from the orientation-discrimination passage when the one or more cartridges are close to or reaching the orientation-discrimination passage.

11. The cartridge dispenser of claim 10, wherein the cavity for storing cartridges comprises cartridges.

* * * * *